FEEDBACK CONTROLLED SINGLE SIDEBAND GENERATOR
Filed Jan. 10, 1961
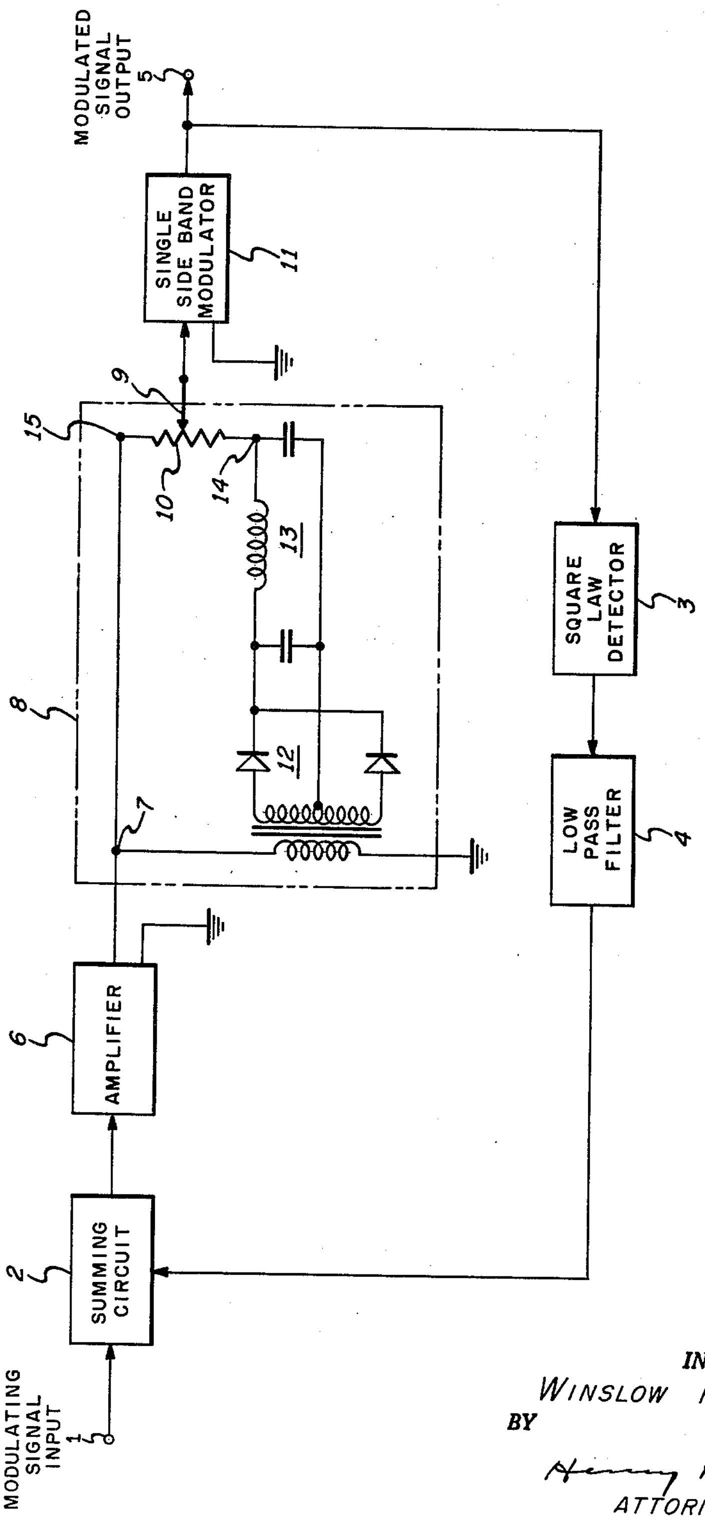
INVENTOR.
WINSLOW PALMER
BY
[signature]
ATTORNEY

United States Patent Office 3,188,581
Patented June 8, 1965

3,188,581
FEEDBACK CONTROLLED SINGLE SIDEBAND GENERATOR

Winslow Palmer, Amityville, N.Y., assignor to Sperry Rand Corporation, New York, N.Y., a corporation of Delaware Filed Jan. 10, 1961, Ser. No. 81,889
3 Claims. (Cl. 332—45)

The present invention generally relates to single sideband communication systems and, more particularly to a simplified generator for producing a modified single sideband transmission which may be demodulated to recover the original modulating or intelligence signal by means of a conventional square law detector.

The ever-increasing requirement for additional radio frequency communication channels has created a consequential demand for methods of reducing the bandwidth required to transmit a given intelligence. One well established method of reducing such bandwidth is based upon the transmission of a single sideband signal. The bandwidth of a conventional single sideband signal is only half that of the classical double sideband amplitude modulated signal.

The realization of reduced bandwidth transmission through the use of the single side band technique, however, is not free of disadvantage. In particular, the demodulation of single sideband signals without distortion presents significant receiver design problems. Such demodulation ordinarily requires that a local carrier signal precisely controlled in frequency and phase, be added to the received signal prior to detection. It has been recognized that a substantial step forward would be achieved in the art if the single sideband type of signal could be modified so that the intelligence signal could be recovered in the receiver without requiring complex local carrier insertion circuits. One proposal to achieve such a result is described in the paper "The Compatibility Problem in Single Sideband Transmission" by K. H. Powers in the August 1960 issue of the Proceedings of the I.R.E., page 1431.

Briefly stated, the cited paper describes a generator for producing an amplitude and phase modulated signal having an envelope whose square is substantially identical in form to that of an applied modulating or intelligence signal. The bandwidth of the modulated signal is no greater than the bandwidth of a conventional single sideband signal carrying the same intelligence. Moreover, the modified signal may be demodulated without distortion by employing a simple square law detector.

In accordance with the cited technique, the phase and amplitude modulation is achieved through the use of a specially designed carrier signal modulator. The carrier signal is first phase modulated and then amplitude modulated, the phase modulating function being the harmonic conjugate of the logarithm of the amplitude modulating function. The amplitude modulating function itself is the square root of the intelligence function. The paper presents a mathematical proof that such phase and amplitude modulation produces a signal possessing the desired properties of narrow banding and detectability in an asynchronous square law detector. Special circuits and special design techniques are involved in producing the logarithmic and harmonic-conjugate signal functions. In terms of the over-all communication system, although the receiver demodulation apparatus has been simplified, the same is not true of the transmitter.

It is the principal object of the present invention to provide a simplified generator for producing a modified single sideband transmission from which intelligence may be recovered at a receiver by simple rectification.

Another object of the invention is to provide a self-regulating generator for producing a modified single sideband signal having an envelope whose square is conformable to an input modulating or intelligence signal.

A further object is to provide a generator embodying conventional circuit components for producing a modified single sideband transmission capable of being demodulated without distortion by simple rectification.

These and other objects of the present invention, as will appear from a reading of the following specification, are achieved in a preferred embodiment by the provision of a conventional single sideband modulator characterized by the production of a single sideband signal whose spectrum is either identical to or mirror symmetrical to that of an input modulating signal except for a predetermined frequency shift. The output of the single sideband modulator is applied by a conventional square law detector to a low-pass filter. The output of the low-pass filter is degeneratively combined with a unipolar modulating or intelligence signal to produce an output signal representing the difference between the corresponding instantaneous values of the squared envelope of the single sideband signal and the modulating signal. The output signal, after suitable amplification, is then applied via a signal processing network to the input of the conventional single sideband modulator. In accordance with well known negative feedback theory, the conventional single sideband modulator is automatically driven by said output signal to produce a modified single sideband signal whose squared envelope matches the shape of the modulating signal to an arbitrary degree of exactitude. The bandwidth of the modified single sideband signal is equal to that of said unipolar modulating or intelligence signal.

For a more complete understanding of the present invention, reference should be had to the following specification and to the sole figure which is a simplified schematic diagram of a preferred embodiment. Referring to the figure, a desired modulating or intelligence signal is applied via input terminal 1 to a first input terminal of summing circuit 2. Circuit 2 may be a conventional linear resistive signal summation network. The second input terminal of circuit 2 is connected to the output of square law detector 3 by means of low-pass filter 4. Detector 3 may be a conventional diode circuit adapted for operation in the square law region of its transfer characteristic. The input terminal of detector 3 is connected to output terminal 5 at which the modified single sideband signal of the present invention is produced.

The output signal of summing circuit 2, representing the difference between the output signal of filter 4 and the modulating signal applied to terminal 1, is applied via amplifier 6 to the input terminal 7 of signal processing network 8. The output signal developed by network 8 at the slider 9 of potentiometer 10 is applied to the input terminal of single sideband modulator 11. Modulator 11 may be any conventional single sideband modulator for producing an output signal characterized by a spectrum which is either identical to or mirror symmetrical to that of the input signal applied via slider 9 except for a predetermined frequency shift. A modulator suitable for use in the preferred embodiment is described in the paper "A Third Method of Generation and Detection of Single Sideband Signals" by Donald K. Weaver in the December 1956 issue of the Proceedings of the I.R.E., page 1703. It should be noted that the cited single sideband modulator does not require any components which must meet critical design criteria such as, for example, a wide band 90° phase shift network.

An understanding of the preferred embodiment will be facilitated by first considering certain underlying principles upon which its operation is based. It is well recognized that a conventional single sideband modulator such as the one disclosed in the cited Weaver paper produces an output modulated signal whose bandwidth is identical to the bandwidth of the input modulating signal. It is also well known, as pointed out in the aforementioned Powers paper, that the bandwidth of the square of the envelope of any given bandpass limited wave (such as the wave at the output of modulator 11) is equal to the spectral width of the given bandpass limited wave.

In terms of the preferred embodiment, the import of the two statements is that the bandwidth of the signal at the output of filter 4 is identical to the bandwidth of the signal at the input to modulator 11. Additionally, amplifier 6 is a linear device and, as will be seen later, network 8 introduces no frequency components higher than those present at the output of amplifier 6. Thus, it can be seen that the bandwidth of the signal applied to the input of amplifier 6 is identical to the bandwidth of the signal at the input to modulator 11. As previously mentioned, summing circuit 2 also is linear in character whereby the bandwidth of its output signal is determined by the bandwidth of the sum of the two input signals.

It remains to show that the bandwidths of the two input signals applied to summing circuit 2 are identical. This would certainly be the case in the event that said two input signals were not only coextensive in bandwidth but also identical as to the amplitude and phase relationships of the component signals. Such complete identity of the two input signals to summing circuit 2 is achieved by the provision of the square law feedback loop comprising detector 3 and low-pass filter 4.

In accordance with the well established general theory of feedback or servo systems, the relationship between the input modulating signal applied to terminal 1 and the feedback signal at the output of filter 4 may be expressed as follows:

$$R^2(t)=G[f(t)-R^2(t)]+D \qquad (1)$$

where G is the generalized transfer function relating the output of the low-pass filter 4 to the output of the summing circuit 2, $f(t)$ represents the modulating signal function applied to terminal 1, $R^2(t)$ represents the squared envelope signal function at the output of filter 4, and D is the distortion factor representing the difference between what would be the output of the single sideband modulator 11 in the absence of the corrective feedback loop and the output actually obtained from modulator 11 in the presence of said loop.

Rearranging Expression 1, there results:

$$R^2(t)=\frac{G}{1+G}f(t)+\frac{D}{1+G} \qquad (2)$$

if G is generally positive and much greater in value than unity (which is the case with sufficient gain of amplifier 6), Expression 2 reduces to:

$$R^2(t)=f(t)+\frac{D}{1+G} \qquad (3)$$

By inspection of Expression 3, it can be seen that to the extent that the gain of amplifier 6 can be made large, the squared envelope function $R^2(t)$ tends to become identical with the signal function $f(t)$. That is, the distortion is reduced in proportion to the value of the generalized transfer function. The validity of the statement, of course, is based on the facts that a single sideband modulator will produce a modulated R.F. output signal having an envelope whose square can be detected and that the amplitude of said modulated R.F. output is a monotonic function of the input signal applied to the modulator.

It is the characteristic of a single sideband modulator and a square law demodulator when connected in the manner of modulator 11, detector 3 and filter 4, that the demodulated envelope amplitude is of the same polarity irrespective of the polarity of the modulator input signal. As a consequence, the feedback through the square law demodulator cannot be degenerative for both polarities of signals at the input of modulator 11. No difficulty is entailed in maintaining feedback stability when a unipolar intelligence signal (a signal which is always of the same polarity although varying in amplitude to represent intelligence) is applied to input terminal 1. There is the possibility, however, that transient signals of opposite polarity might appear momentarily at the output of summing circuit 2. A condition of feedback instability would then arise. Signal processing network 8 is provided to insure that the signals at the input of modulator 11 are always of the same predetermined polarity.

Network 8 consists of two signal branches, one branch being a direct connection between the output of amplifier 6 and potentiometer 10 and the other branch comprising full wave rectifier 12 and low-pass filter 13 which are connected in series circuit between the same two elements. Irrespective of the polarity (D.C. component) of the signal wave at the output of amplifier 6, a positive D.C. potential representing the average value of the signal at the output of amplifier 6 will be produced at terminal 14 of potentiometer 10 by the action of full wave rectifier 12 and low-pass filter 13. The signal wave at the output of amplifier 6 is directly applied to terminal 15 of potentiometer 10 wherein it is additively combined with the direct potential at terminal 14. Slider 9 of potentiometer 10 is adjusted so that the contribution of the direct potential generally is greater than that of the signal wave at terminal 15. In this manner, the polarity or D.C. component of the signal wave at slider 9 remains positive irrespective of the polarity of the signal at the output of summing circuit 2 which polarity, in turn, is determined by the polarity of the modulating signal applied to terminal 1. The result is that the operation of the over-all feedback modulator of the preferred embodiment is stabilized under all signal conditions which are likely to occur.

It can be seen from the preceding specification that the objects of the present invention have been achieved in a preferred embodiment by the provision of a conventional single sideband modulator for producing an amplitude and phase modulated high frequency signal determined in accordance with the operation of a feedback circuit. The feedback circuit comprises a square law detector and low-pass filter for deriving the square of the envelope at the output of the single sideband modulator. The squared envelope signal is combined with a desired input modulating or intelligence signal to produce a control signal. The control signal, after suitable amplification, is applied to the single sideband modulator by means of a signal processing network which insures that the control signal as applied to the single sideband modulator will always be of a predetermined polarity. As the result of the operation of the negative feedback, the squared envelope of the output signal of the single sideband modulator is constrained to follow the input modulating or intelligence signal to an arbitrarily close degree.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A signal generator comprising a single sideband modulator having input and output terminals, said modulator producing an amplitude and phase modulated high frequency signal at said output terminal in response to a control signal applied to said input terminal, said high frequency signal having a spectrum which is either identical to or mirror-symmetrical to the spectrum of said control signal except for a predetermined frequency shift, means for detecting said high frequency signal for producing a unipolar feedback signal representing the squared envelope of said high frequency signal, a source of unipolar modulating signals having a polarity opposite to that of said feedback signal, means for combining said modulating and feedback signals to produce said control signal, and means for applying said control signal to said input terminal of said modulator.

2. A signal generator compriisng a single sideband modulator having input and output terminals, said modulator producing an amplitude and phase modulated high frequency signal at said output terminal in response to a control signal applied to said input terminal, said high frequency signal having a spectrum which is either identical to or mirror-symmetrical to the spectrum of said control signal except for a predetermined frequency shift, a signal summing circuit having two input terminals and an output terminal, a first low-pass filter and a square law detector connected in series circuit between one of said input terminals of said summing circuit and said output terminal of said modulator, a source of modulating signals connected to the other of said input terminals of said summing circuit, and a signal amplifier and a signal processing network connected in series circuit between said output terminal of said summing circuit and said input terminal of said modulator; said network comprising a full wave rectifier and a second low-pass filter connected to the output of said signal amplifier for producing a first signal representing the average value of the signal at the output of said signal amplifier, and resistive means connected to the output of said signal amplifier and to the output of said second filter for combining said first signal and said signal at the output of said signal amplifier to produce said control signal, said control signal being applied to said input terminal of said modulator.

3. A signal generator comprising a single sideband modulator having input and output terminals, said modulator producing an amplitude and phase modulated high frequency signal at said output terminal in response to a control signal applied to said input terminal, said high frequency signal having a spectrum which is either identical to or mirror-symmetrical to the spectrum of said control signal except for a predetermined frequency shift, a signal summing circuit having two input terminals and an output terminal, a low-pass filter and a square law detector connected in series circuit between one of said input terminals of said summing circuit and said output terminal of said modulator, a source of modulating signals connected to the other of said input terminals of said summing circuit, a signal amplifier connected to said output terminal of said summing circuit, and a signal processing network for connecting the output of said signal amplifier to said input terminal of said modulator; said network comprising means for producing a first signal representing the average value of the signal at the output of said signal amplifier, and means for combining said first signal and said signal at the output of said signal amplifier to produce said control signal, said control signal being applied to said input terminal of said modulator.

References Cited by the Examiner

UNITED STATES PATENTS

| | | | |
|---|---|---|---|
| 2,298,930 | 10/42 | Decino | 332—37 |
| 3,002,161 | 9/61 | Feryszka | 332—45 |

ROY LAKE, *Primary Examiner.*

L. MILLER ANDRUS, *Examiner.*